(12) United States Patent
Yik et al.

(10) Patent No.: US 7,760,719 B2
(45) Date of Patent: Jul. 20, 2010

(54) COMBINED PIPELINED CLASSIFICATION AND ADDRESS SEARCH METHOD AND APPARATUS FOR SWITCHING ENVIRONMENTS

(75) Inventors: James Yik, Mission Viejo, CA (US);
Rong-Feng Chang, Irvine, CA (US);
Eric Lin, Irvine, CA (US); John Ta,
Laguna Niguel, CA (US); Craig Barrack, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 998 days.

(21) Appl. No.: 10/881,226

(22) Filed: Jun. 30, 2004

(65) Prior Publication Data

US 2006/0002386 A1 Jan. 5, 2006

(51) Int. Cl.
*H04L 12/28* (2006.01)
(52) U.S. Cl. .................. 370/389; 370/392; 370/395.42
(58) Field of Classification Search ............... 370/412, 370/428, 465, 469, 395.52, 395.5, 392, 463
See application file for complete search history.

(56) References Cited

U.S. PATENT DOCUMENTS

| | | | |
|---|---|---|---|
| 5,748,905 A * | 5/1998 | Hauser et al. ............... 709/249 |
| 6,229,787 B1 | 5/2001 | Byrne | |
| 6,370,666 B1 | 4/2002 | Lou et al. | |
| 6,697,873 B1 | 2/2004 | Yik et al. | |
| 6,763,479 B1 | 7/2004 | Hebert | |
| 6,963,566 B1 * | 11/2005 | Kaniz et al. ............... 370/392 |
| 7,107,359 B1 * | 9/2006 | Burton et al. ............... 709/250 |
| 7,450,507 B2 * | 11/2008 | Tundlam et al. ............ 370/232 |

(Continued)

FOREIGN PATENT DOCUMENTS

EP 1416671 A2 5/2004

(Continued)

OTHER PUBLICATIONS

Lau, M.V. et al.; "Gigabit Ethernet Switches Using a Shared Buffer Architecture"; IEEE Communications Magazine; Dec. 12, 2003; pp. 76-84; vol. 41. No. 12; IEEE Service Center; New York, NY, US.

(Continued)

*Primary Examiner*—Huy D Vu
*Assistant Examiner*—Brandon Renner
(74) *Attorney, Agent, or Firm*—Thomas, Kayden, Horstemeyer & Risley, LLP

(57) ABSTRACT

A packet switching node in a pipelined architecture processing packets received via an input port associated with the packet switching node performs a method, which includes: determining a packet frame type; selectively extracting packet header field values specific to a packet frame type, including packet addressing information; ascribing to the packet a preliminary action to be performed; searching packet switching information tracked by the packet switching node based on extracted packet addressing information; formulating a preliminary switch response for the packet; classifying the packet into a packet flow; modifying the preliminary switch response in accordance with one of the preliminary action, the packet flow into which the packet was classified, and a default port action corresponding to the input port; modifying the packet header in accordance with one of the preliminary action, the packet flow, and the default port action; and processing the packet.

17 Claims, 6 Drawing Sheets

U.S. PATENT DOCUMENTS

| | | | |
|---|---|---|---|
| 7,457,297 B2 * | 11/2008 | Woo et al. | 370/395.41 |
| 2002/0054604 A1 | 5/2002 | Kadambi et al. | |
| 2002/0085560 A1 | 7/2002 | Cathey et al. | |
| 2002/0116442 A1 | 8/2002 | Modelski et al. | |
| 2002/0116521 A1 | 8/2002 | Paul et al. | |
| 2002/0186683 A1 | 12/2002 | Buck et al. | |
| 2003/0012137 A1 | 1/2003 | Abdelilah et al. | |
| 2003/0053448 A1 * | 3/2003 | Craig et al. | 370/353 |
| 2003/0088698 A1 | 5/2003 | Singh et al. | |
| 2003/0214945 A1 * | 11/2003 | Kawamura | 370/389 |
| 2003/0231625 A1 * | 12/2003 | Calvignac et al. | 370/389 |
| 2004/0013118 A1 | 1/2004 | Borella | |
| 2004/0032872 A1 * | 2/2004 | Dhara | 370/401 |
| 2004/0037319 A1 * | 2/2004 | Pandya | 370/469 |
| 2004/0085894 A1 | 5/2004 | Wang et al. | |
| 2004/0146044 A1 * | 7/2004 | Herkerdorf et al. | 370/351 |
| 2005/0125557 A1 | 6/2005 | Vasudevan et al. | |
| 2005/0147028 A1 | 7/2005 | Na et al. | |

FOREIGN PATENT DOCUMENTS

| | | |
|---|---|---|
| JP | 02073746 | 3/1990 |
| JP | 08163242 | 6/1996 |
| JP | 09135252 | 5/1997 |
| JP | 09198334 | 7/1997 |
| JP | 2000286896 | 10/2000 |
| JP | 2001211203 | 8/2001 |
| JP | 2001297016 | 10/2001 |
| JP | 2002044150 | 2/2002 |
| JP | 2002051080 | 2/2002 |
| JP | 2002271379 | 9/2002 |
| JP | 2002290428 | 10/2002 |
| JP | 2003008581 | 1/2003 |
| JP | 2003188905 | 7/2003 |
| JP | 2003273930 | 9/2003 |
| JP | 2003298660 | 10/2003 |

OTHER PUBLICATIONS

Foreign Office Action mailed Mar. 4, 2008, Japanese Patent Application No. 2005-190646.
Foreign Office Action for DE102005029396.4-31 mailed Nov. 29, 2006.
Foreign Office Action for DE102005029396.4-31 mailed Mar. 26, 2009.
Foreign Office Action for JP200510080731.2 mailed Mar. 11, 2008.
Foreign Office Action for JP200510080731.2 mailed Dec. 16, 2008.
Foreign Office Action for JP200510080731.2 (Decision of Rejection) mailed Jun. 30, 2009.
Foreign Office Action for JP2005-190646 mailed Mar. 4, 2008.
Foreign Office Action for JP2005-190646 mailed Oct. 28, 2008.
Foreign Office Action for CN2005100807261 mailed Jan. 4, 2008.
Foreign Office Action for CN2005100807261 mailed Jun. 30, 2008.
Foreign Office Action for CN2005100807261 mailed Mar. 13, 2009.

* cited by examiner

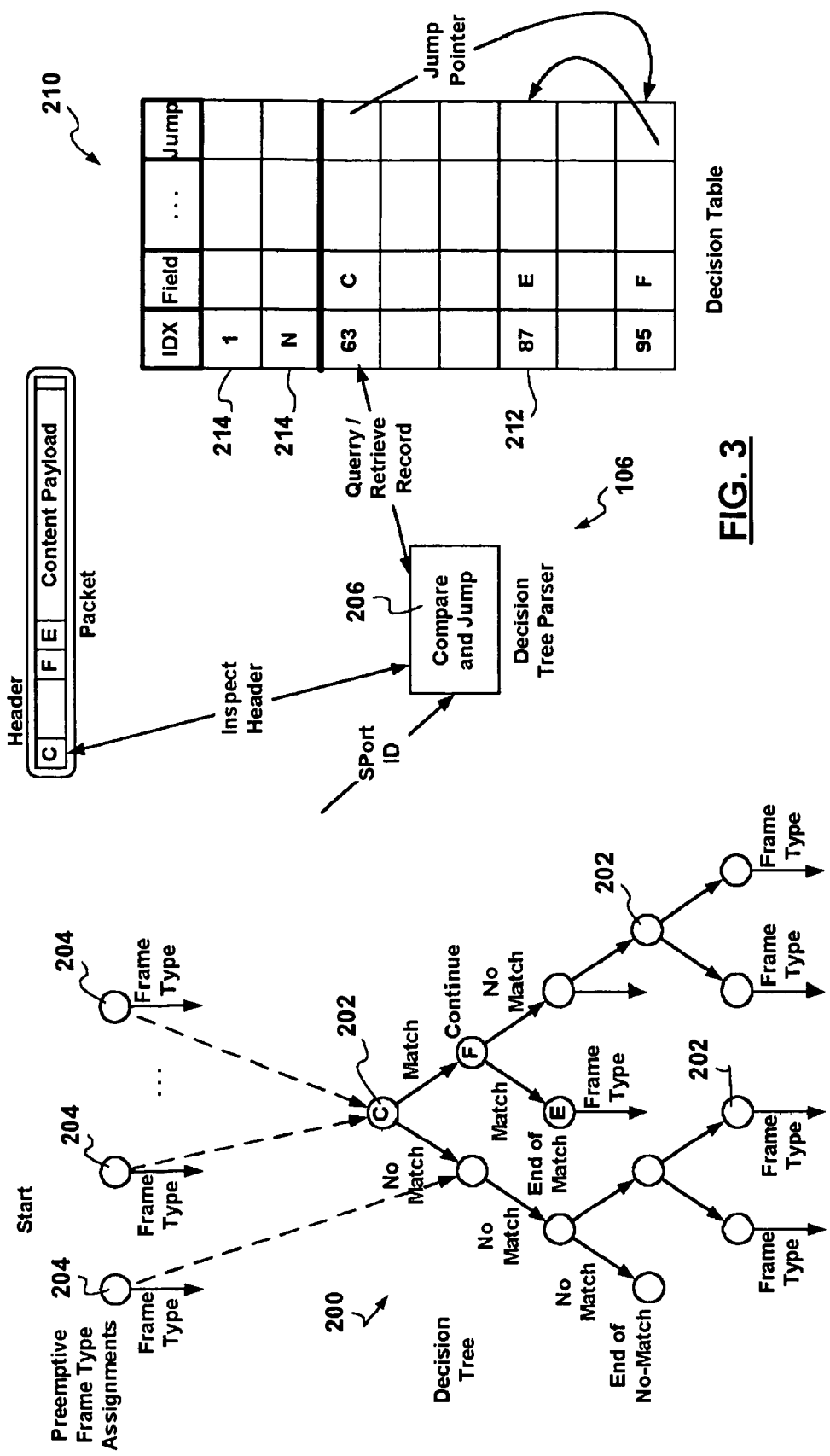

COMBINED PIPELINED CLASSIFICATION AND ADDRESS SEARCH METHOD AND APPARATUS FOR SWITCHING ENVIRONMENTS

FIELD OF THE INVENTION

The invention relates to packet-switched communications, and in particular to combined pipelined search and classification methods and apparatus.

BACKGROUND OF THE INVENTION

In the field of packet-switched communications, content conveyed between a source network node and a destination network node participating in a communications network, is segmented for transport in packets. Packets have a structure including a packet header and a content payload. Communications network nodes in the path between the source and destination network nodes, such as, but not limited to, switching network nodes, receive, store, inspect, process, and forward each packet based on information specified in the packet header. This mode of operation is know as non-deterministic store-and-forward packet-switching.

Switching network nodes are multiported network nodes. Processing each stored packet received via an input port includes determining at least one output port via which to forward the stored packet. The determination of the at least one output port coupled with actual forwarding via the at least one determined output port is know as packet switching. An important characteristic of a generic switching network node, and a requirement of a switching network node employed in the core of a communications network, is that, output bandwidth permitting, store-and-forward packet-switching be performed at incoming line/wire speed on an ongoing basis. While such a requirement seems reasonable, in practice it is difficult to achieve in spite of, and because of, numerous recent advances in the field.

The history and development of packet-switched communications is very diverse including: the use of multiple technologies to at the physical Layer-1 such as: wired, wireless, optical physical transport etc.; the use of multiple encapsulation technologies at the data-link Layer-2 including Ethernet technologies; the use of multiple transport protocols at the network Layer-3 including the Internet Protocol (IP), Internet Control Message Protocol (ICMP), etc. The IP-over-Ethernet technologies enjoy the widest deployment.

For example, standard IP/Ethernet provides non-deterministic best-effort packet transport. The non-deterministic characteristics provide for autonomous re-routing of packets around failed communications network infrastructure, however the best-effort characteristic does not provide guarantees regarding successful (not even untimely) packet transport between the source and destination network node. A Transport Control Protocol (TCP) is further employed to identify missing packets providing the means for requesting retransmission thereof. Timely packet transport is addressed via traffic/service differentiation and provided through preferential packet processing at intermediary communications network nodes between the source and destination network nodes.

It is difficult to address all of the above issues in providing sustained packet-switching at wire/line speed. While theoretical developments in this regard provide assurances that such switching network nodes could be constructed, practical implementations are mired with high development, implementation, and validation costs, as well suffer from various implementation complexities. Due to a rapid development in the field, not only are switching network nodes required to operate at line/wire speed while processing multi-protocol minimum length packets, also a measure of flexibility is desired to delay equipment obsolesce in view of future technology developments:

In prior art United States Patent Application publication No. 2002/54604 A1 entitled "Network Switching Architecture with Fast Filtering Processor" which became available to the public on May 9, 2002, Kadambi et al. describe a method and apparatus for filtering packets received via an input port. Packet processing culminating in a decision whether to discard a packet, is know as packet filtering. While Kadambi et al. teach implementation of switching network node functions on a single chip wherein switching node functions are modularized for independent development, the implementation described is complex and cumbersome as, filtering implemented in respect of each port requires a complex arbitrated group of three channels providing internal communication between the port modules. Packet filtering on its own does not switch packets, only provides the means to reduce unnecessary packet processing. Some security aspects are also addressed through packet filtering which further points to the importance of packet filtering. While port based filtering may very well provide packet filtering at line/wire speed, filtering alone does not address the other above mentioned issues regarding packet processing at a switching network node.

Co-assigned U.S. Pat. No. 6,697,873 B1 entitled "High Speed MAC Address Search Engine" issued Feb. 24, 2004 to Yik et al. (some of which are named inventors herein) and incorporated herein by reference, describes an apparatus and method for storing and searching network node addresses in a communications network node, such as a switching network node. The apparatus includes two Media Access Control (MAC) address tables for storing and searching MAC addresses. A primary MAC Address table stores records specifying compressed values corresponding to MAC addresses, and each record is stored at storage a location referenced using the hashed MAC address value as an index. In order to account for search collisions that may result from multiple MAC addresses hashing to the same index, and therefore to the same location in the primary MAC address table, each record in the primary MAC address table is further linked to a corresponding chain of records stored in the secondary MAC address table. Records in the secondary MAC address table specify full MAC addresses. MAC address storage at switching network nodes is important in reducing the processing required in switching packets: records in the MAC address tables also include previously determined output ports for similarly addressed packets. Fast retrieval of MAC address records from the MAC address tables is important in achieving fast packet switching. The implementation described by Yik et al. provides a balance between cost of implementing MAC address lookups and the speed of the MAC address search.

Co-pending co-assigned U.S. patent application Ser. No. 10/750,445 entitled "High Speed MAC Address Search Engine" filed Dec. 31, 2003 by Barrak et al. (some of which are inventors named herein) and incorporated herein by reference, describes an improved apparatus and methods for storing and searching network node addresses in a communications network node such as a switching network node.

The apparatus includes two Media Access Control (MAC) address tables for storing and searching MAC addresses. A primary MAC address table, external to the packet switching processor, stores records specifying compressed values corresponding to MAC addresses, more than one record being stored at storage locations referenced using hashed MAC address values as indicia. External storage of the primary MAC address table enables the use off the shelf memories providing ample storage which is balanced against a data transfer overhead between the switching processor and the external memory. In order to account for search collisions that may result from multiple MAC addresses hashing to the same index, each record in the primary MAC address table is further linked to corresponding chains of records stored in the secondary MAC address table. Records in the secondary MAC address table specifies compressed MAC addresses to minimize secondary MAC address table storage requirements particularly as the secondary MAC address table is implemented on the same microchip die with the packet switching processor.

While the above described developments towards improved switching performance have made great strides, there still is a need to address the above mentioned issues in further improving switching performance particularly in support of higher port densities.

SUMMARY OF THE INVENTION

In accordance with an aspect of the invention, a flexible header parsing scheme is provided, wherein three header parsing engines are employed in parallel to determine various frame types based on the inspection of specific packet header bit patterns of incoming packets at full line/wire rate. Employing three header parsing engines provides flexibility: a hardware engine provides fast frame type identification for standard well-known frame types, a configurable decision tree parsing engine determines frame types through a successive frame type elimination process, and a configurable template match engine performs bit template comparisons.

In accordance with another aspect of the invention, packet header field values are extracted from the packet header after frame type determination which ensures minimum and fast preprocessing. A user configurable field extractor is employed. Offsets for extracted fields may be specified in respect of each frame type. For some packet types, a packet processing action may be determined at this early stage in the pipeline.

In accordance with a further aspect of the invention, implementation costs are reduced by mapping Layer-2 source and destination MAC addresses, and Layer-3 source and destination IP addresses into an internal index used in searching address tables. A combined L2 and L3 search engine employs a hashing-based search scheme to map extracted network addressing field values into an index having a short bit length.

In accordance with yet another aspect of the invention, final actions are ascribed to classified packets, including, but not limited to: Virtual Local Area Network IDentifier (VLAN ID) insertion, VLAN re-mapping, Type-of-Service (TOS) re-mapping, Quality-of-Service (QoS) enforcement, filtering, forwarding, and header modification.

In accordance with an aspect of the invention, a packet switching node having a pipelined packet processing architecture is provided. The packet switching node includes: means for determining a packet frame type of a packet received via an input port of the packet switching node; means for selectively extracting packet header field values specific to a packet frame type, the extracted packet header field value including packet addressing information; means for ascribing to the packet a preliminary action to be performed in respect of the packet; means for searching packet switching information tracked by the packet switching node based on extracted packet addressing information; and means for formulating a preliminary switch response for the packet. A packet classifier classifies the packet into one of a plurality of packet flows. A switch response modifier modifies the preliminary switch response in accordance with one of the preliminary action, the packet flow into which the packet was classified, and a default port action corresponding to the input port. A packet header modifier modifies the packet header in accordance with one of the preliminary action, the packet flow, and the default port action. The packet switching node further including means for processing the packet in accordance with the switch response.

In accordance with another aspect of the invention, a method of processing packets received at a packet switching node via an input port is provided. A packet frame type of the packet received is determined. Packet header field values specific to the packet frame type are selectively extracted, the extracted packet header field values including packet addressing information. A preliminary action to be performed in respect of the packet is ascribed to the packet. Packet switching information tracked by the packet switching node is searched based on extracted packet addressing information. A preliminary switch response is formulated. The packet is classified into one of a plurality of packet flows. The preliminary switch response is modified in accordance with one of the preliminary action, the packet flow into which the packet was classified, and a default port action corresponding to the input port. The packet header is modified in accordance with one of the preliminary action, the packet flow, and the default port action. And, the packet is processed in accordance with the switch response.

In accordance with a further aspect of the invention, a packet switching node having a pipelined packet processing architecture for processing packets received via a multitude of packet switching node source ports is provided. The packet switching node includes a packet header field value extractor for selectively extracting packet header field values from the multitude of packet header field values conveyed by each packet based on one of the source port via which the packet was received and a previously determined packet frame type. The packet switching node further including means for ascribing a match type to the packet, the match type preclassifying the packet based on the extracted packet header field values irrespective of the format of the packet frame. The packet switching node further including means for searching one of packet switching information, packet routing information, and protocol virtual local area networking information tracked by the packet switching node based on one of extracted packet header field values, the match type, and the source port for formulating a preliminary switch response for the packet. A packet classifier for classifying the packet into one of a multitude of packet processing flows based on one of the source port identifier, the preliminary switch response, extracted packet header field values, and the match type.

In accordance with yet another aspect of the invention, a method for processing packets received via a plurality of source ports of a packet switching node having a pipelined packet processing architecture is provided. Packet header field values are selectively extracted from the plurality of packet header field values conveyed by each packet based on one of the source port via which the packet was received and a previously determined packet frame type. The packet is preclassified, irrespective of the format of the packet frame, based on the extracted packet header field values and a match type is ascribed to the packet. One of packet switching information, packet routing information, and protocol virtual local area networking information tracked by the packet switching node is searched based on one of extracted packet header field values, the match type, and the source port for formulating a preliminary switch response for the packet. And, the packet is classified into one of a plurality of packet processing flows based on one of the source port identifier, the preliminary switch response, extracted packet header field values, and the match type.

Advantages are derived from: pipelined packet processing enabling short-cutting the rest of the packet processing pipeline; a flexible frame type determination which is fast for well know frame types, yet flexible providing support of new frame types delaying obsolescence of a particular implementation; an early determination of a processing action which is successively refined by subsequent stages; a combined Layer-2 and Layer-3 network addressing search engine operating on short bit length indexed Layer-2 and Layer-3 network addresses reducing network address table storage requirements, requiring a reduced data transfer bandwidth for network address table access, enabling the storage of a large number of hashed entries in the external primary network address table, and a relatively large number of entries in the internal secondary network address table; an early determination of a switch response; and packet-classification-based switch response and packet header modification.

BRIEF DESCRIPTION OF THE DRAWINGS

The features and advantages of the invention will become more apparent from the following detailed description of the exemplary embodiment(s) with reference to the attached diagrams wherein:

FIG. 2 is a schematic diagram showing, in accordance with the exemplary embodiment of the invention, a conceptualization of successive frame type elimination;

FIG. 3 is a schematic diagram showing, in accordance with the exemplary embodiment of the invention, exemplary elements of a decision tree parsing engine;

It will be noted that in the attached diagrams like features bear similar labels.

DETAILED DESCRIPTION OF THE EXEMPLARY EMBODIMENTS

In accordance with an exemplary embodiment of the invention, a combined pipelined packet classification and address search engine is provided enabling support for differentiated services such as filtering, billing, and quality-of-service offerings.

In accordance with the exemplary embodiment of the invention, one of the functions of a packet classifier is to categorize packets into packet flows, typically, by examining multiple packet header field values. Rules used by the packet classifier specify which field values to examine and what values are expected. Packets matching the same rule are classified as belonging to the same packet flow within the equipment implementing the invention. In processing such packets, the same packet processing action(s) is(are) performed in processing thereof, action(s) which typically include switching the packet.

Figure 1:
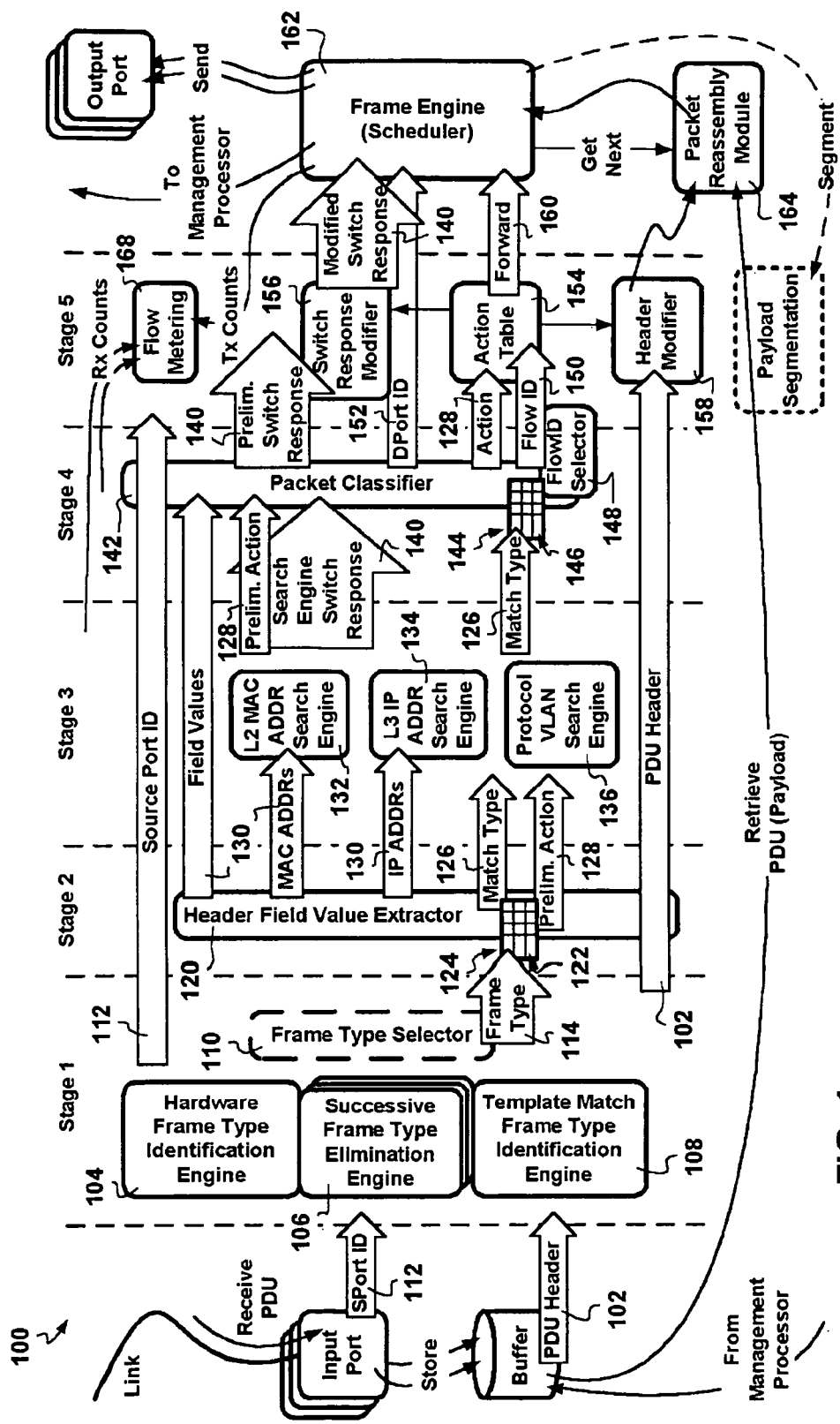
FIG. 1 is a schematic diagram showing elements implementing, in accordance with the exemplary embodiment of the invention, a combined pipelined search and classification engine for packet switching environments.

In accordance with the exemplary embodiment of the invention, packet classification, and Layer-2 and Layer-3 network address searching are integrated employing a staged pipeline architecture 100 as shown in FIG. 1.

In accordance with the exemplary embodiment of the invention, packet frame type determination is performed by stage 1 prior to packet header field extraction, determining the packet frame before processing packets reduces processing in extracting field values from packet headers to the minimum necessary. Three packet frame type determination engines are employed in parallel to identify frame types of received packets. In accordance with an exemplary implementation of the exemplary embodiment of the invention, at least 256 packet frame types can be discriminated therebetween, without limiting the invention thereto. The packet frame type determination engines inspect portions of each packet header 102 of each received packet, and include:

A hardware frame type determination engine 104 provides very fast packet frame type identification for packet frame formats typically specified in widely accepted standards such as the IEEE 802x Standard published by the Internet Engineering Task Force (IETF), which is incorporated herein by reference. Without limiting the invention, the operation of the hardware engine 104 is optimized during hardware design and manufacture thereof. The hardware engine 104 is typically implemented as hardware logic on a chip—which may afford some run-time customization. Extensive run-time customization is sacrificed in favor of very fast packet frame type determination and a bound predetermined packet frame type determination delay. Most of the packet traffic comprises standard packets and, and without limiting the invention, typically at least 112 packet frame types can be identified with minimal delay and minimal processing overhead.

In accordance with an exemplary implementation, the hardware engine 104 determines a standard packet frame type, such as for example that of a VLAN tagged Ethernet-II encapsulated TCP/IP packet, whose format is shown as below:

| B7 | | | | | | | | | | | | | B0 |
|---|---|---|---|---|---|---|---|---|---|---|---|---|---|
| Source MAC address Byte 0-1 | | | | Destination MAC address | | | | | | | | | |
| VID (7-0) (TCI0) | P | C | VID 11-8 | VTAG0 (0x00) | VTAG1 (0x81) | Source MAC address byte 3-5 | | | | | | | |
| IP_ID0 | | IP_ID1 | | PKT_LEN0 | PKT_LEN1 | TOS | | VER | IHL | Etype0 (0x00) | | Etype1 (0x08) | |
| S_IP2 | | S_IP3 | | IP_CHK0 | IP_CHK1 | Protocol ID(0x11) | | TTL | | Fg offset (5-12) | FLG (3) | F offset | |
| S_TCPort0 | | S_TCPort1 | | D_IP0 | D_IP1 | D_IP2 | | D_IP3 | | S_IP0 | | S_IP1 | |
| ACKNUM2 | | ACKNUM3 | | TCP_SEQ0 | TCP_SEQ1 | TCP_SEQ2 | | TCP_SEQ3 | | D_TCPort0 | | D_TCPort1 | |
| TCP_CHK0 | | TCP_CHK1 | | Window0 | Window1 | A U | R P | F S | LEN | ACKNUM0 | | ACKNUM1 | |
| | | | | | | | | | | URGpoint0 | | URGpoint1 | |
| | | | | | | | | | | | | | |

The hardware frame type determination engine 104 identifies the VLAN tagged Ethernet-II encapsulated TCP/IP packet by matching header field values at specified offsets (locations) as follows:
the value of the 12th Byte=0x81;
the value of the 13th Byte=0x00;
the value of the 16th Byte=0x08;
the value of the 17th Byte=0x00; and
the value of the 27th Byte=0x11.

Once the packet header field values are found to match the predefined pattern, a corresponding frame type value is associated with the packet.

It is possible for standards to change or to become obsolete, one way to address potential premature obsolescence, as described herein below, is to prioritize the frame type outputs from configurable frame type determination engines 106/108 over the hardware engine 104.

Another way to address potential premature obsolescence, is to prevent matching old standard frame types by disabling corresponding hardware logic portions of the hardware engine 104. In this way processing overheads are reduced to the minimum necessary. However, backward compatibility is typically desired if no conflicts arise, and hardware logic portions of the hardware engine 104 may only be disabled if the old standard frame type identification interferes with desired operation.

A successive frame type elimination process is performed by a decision tree parsing engine 106. The relationship between the frame types best suited for discrimination therebetween via successive frame type elimination is a "type-of" relationship. As is well known in the art, Layer-3 datagrams (proto-packets) are encapsulated in Layer-2 datagrams. As a simple example, the decision tree parsing engine 106 discriminates between packet frame types having different Layer-3 header formats but the same Layer-2 header format. A certain flexibility is therefore provided in re-specifying type-of relationships in customizing the operation of the decision tree parsing engine 106 in the field. Without limiting the invention, an exemplary implementation may support upward of 128 frame types in addition to the frame types detected by the hardware engine 104.

In accordance with an exemplary implementation of the exemplary embodiment, type-of relationships between frame types are exemplary specified as nodes 202 of a decision tree. An exemplary binary decision tree 200 is schematically shown in FIG. 2. Each pre-defined packet frame format is identified by applying a specific sequence of tests, sequence which is specified by relationships between nodes 202 in the decision tree 200. Practical implementations of the nodes 202 include records 212 of a decision table 210, each record 212 is associated with a decision table row index and includes: a packet header offset of a frame type identification bit pattern, a frame type identification test bit pattern, and jump instructions. The frame type identification test bit pattern may include a bit mask, a binary value, and a compare binary value, for determining whether packet header field value bits, corresponding to at least one packet header field, equal an expected value, subject specified ignored bits. The jump instructions include specifiers specifying whether the successive frame type elimination process has completed; if incomplete, to which decision table row index to jump next, if a bit pattern match test is positive and if negative. The following record 212 specification, in accordance with an exemplary implementation of the exemplary embodiment of the invention, is representative of exemplary information held in each record 212:

| Field Name | Description |
|---|---|
| Compare Word | Specifies the location of 2 Bytes of packet header information comparison. |
| Compare Value | Comparison Value |
| Mask | Bit mask of the corresponding 2 Bytes |
| Jump to index on positive match test result/ | JUMP address for a match or Frame Type Value A) Jump to the specified address if the comparison is a match when the End of MATCH bit = 0 |
| Frame Type | B) Indicate the Frame Type value when the End of MATCH bit = 1 |
| End of Match | Indicates the end of the comparisons. If this bit is logic high, then the value stored in the next jump address field for a match is the Frame Type |
| Jump to index on negative match test result | JUMP address for a non-match or Frame Type Value Jump to the specified address when the comparison does not lead to a match when the End of MATCH bit = 0 |
| End of Not Match | Indicates the end of the comparisons. |

Storage space efficiencies are exemplary achieved by reusing record fields for multiple purposes as in the case of the jump instruction fields which are reused for frame type specification for the end of the frame type determination records 212.

While the decision tree parsing engine 106 may not provide a predetermined processing delay in identifying a packet frame type when compared with the hardware engine 104, the type-of relationship specification requires only minimal frame type definition storage and provides support for additional/amended standard frame formats for standards developed/amended subsequent to the manufacture of the switching equipment implementing the decision tree parsing engine 106.

It is possible for the decision tree parsing engine 106 to take a relatively long period of time to identify the frame type for a received packet. A single decision tree parsing engine 106 may be employed as long as the decision tree parsing engine 106 can identify the frame type of a received packet, assuming that packets are received header first, in the time it takes to receive a minimum size packet payload. The minimum size Ethernet packet, header and payload, is 64 bytes with a 20 byte inter-frame gap taking preamble into account. In order to ensure packet processing at line/wire speed, either the decision tree 200 has to be expressed such that a relatively small number of decision tree nodes 202 are to be consulted to determine frame types, or multiple decision tree parsing engine 106 may be employed. Depending on the intended use of the equipment implementing the decision tree parsing engine 106 to identify frame types, it may be sufficient for the frame type determination to be completed, on average, at the average packet arrival rate.

In accordance with an exemplary implementation of the exemplary embodiment of the invention, the decision tree parsing engine 106 microcode logic can execute one test (202/204/212/214) per clock tick.

In accordance with an exemplary implementation of the exemplary embodiment of the invention, the decision tree parsing engine 106 includes a microcode implementation of a decision tree parser 206 and of the decision table 210.

Depending on the implementation, a source port identifier 112 is provided to the first stage of the pipeline 100, and any of the frame type determination engines 104, 106, and 108 may provide a frame type specification 114 determined solely based on the source port specification. Source-port-identifier-based frame type determination may be employed when the frame type of packets received via a specific port is know a priori.

In accordance with the exemplary implementation of the exemplary embodiment of the invention the decision tree parsing engine 106 further implements port-based frame type determination. The decision table 210 further includes rows 214 corresponding to input ports of the switching equipment implementing the decision tree parsing engine 106. In accordance with an exemplary implementation of the exemplary embodiment of the invention, the first N decision table records 214 are employed for implementing decision tree nodes 204 (multiple start points), where N corresponds the number input ports of the switching system implementing the decision tree parsing engine 106. Advantageously, the source port identifier 112 corresponding to the input port on which packets are received, may be used directly as an index in retrieving decision table records 214 without intermediary processing. The invention is not limited to this implementation—each input port identifier 112 may be mapped to a decision table row index either on a one-to-one basis or a many-to-one basis.

The decision tree parser 206 then, upon the source port identifier 112 (and the header 102) being made available to stage 1 of the pipeline, first retrieves the corresponding decision table record 214, and the decision tree parser 206 applies the test specified therein. Advantageously, with each decision tree node 204 representing a separate, input port specific, starting point for the successive frame type elimination process, at least one decision tree record 214 may be configured with field values providing early frame type determination based on the source port identifier 112 alone. Decision tree records 204 may be user configured to specify a frame type when only a specific frame type is expected to describe received packets at the corresponding input port. Advantages are apparent for trunk ports and particularly providing fast frame type determination for non-standard packet frame formats.

Further enhancements in speeding up the successive frame type elimination process when packets having multiple frame format types are expected to be received via an input port, are achieved through a flexibility provided in specifying jump instructions to point to different sub-trees of the decision tree 200. One such exemplary implementation includes a switching node employed at on the edge of a communication network in convergent applications provisioning simultaneous data and voice services, where on the transport/provider-side of the switching equipment, data and voice are received on different ports (a very plausible implementation). In respect of a Voice-over-IP (VoIP) solution, identifying IP packet headers for packets conveyed in the downlink direction and received via a VoIP trunk port, determining the frame type may be pre-empted by jumping directly to the same sub-tree of the decision tree 200 for packets received via either trunk ports. Parsing the sub-tree may still be needed to determine whether VoIP packets are a plain Ethernet packets or Ethernet packets with VLAN headers. In respect of packets traversing the communications network node in the uplink direction, the data and voice packets are typically received via the same distribution-side input port associated with a customer, however data and voice packets may be conveyed over separate "virtual connections" identified for example by different Type-of-Service (TOS) packet header field value specification. The flexibility provided in specifying the decision tree 200 is further apparent considering that despite the inability of arriving at an early decision solely based on the input port identifier 112, as the corresponding decision tree record 214 may be user-coded to specify that the frame type determination process first consider Type-of-Service determination via a specific jump to a particular sub-tree of the decision tree 200.

Figure 4:
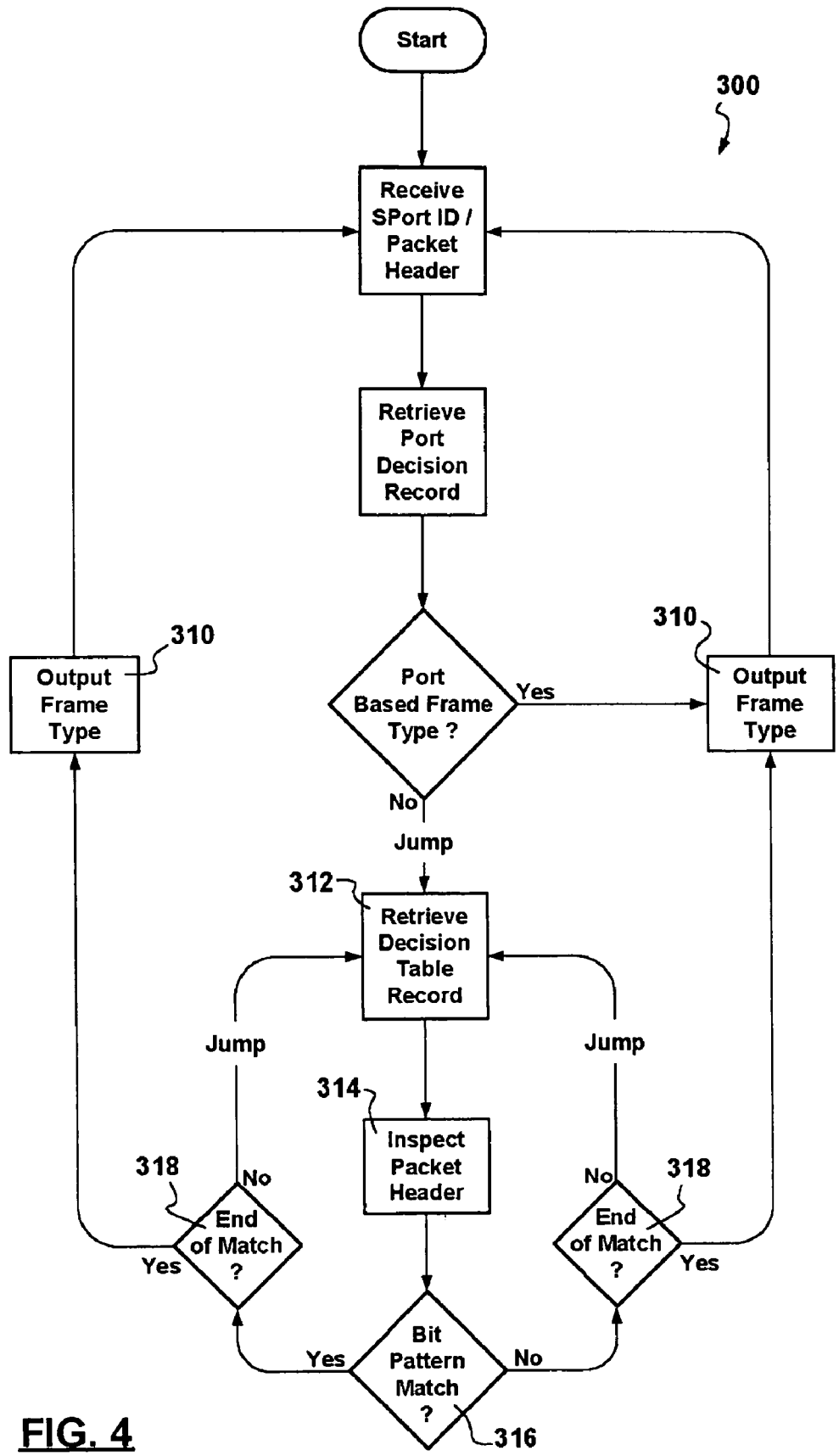
FIG. 4 is a flow diagram showing, in accordance with the exemplary embodiment of the invention, cyclical steps of a successive frame type elimination process.

An exemplary cyclical operation (300) of the decision tree parser 206 is shown in FIG. 4, the decision tree parser 206 retrieves 312 a record 212 from the decision table 210, and retrieves 314 packet header bit values from the packet header having an offset (and bit length) specified in the record 212 fields. The retrieved binary value is matched 316 against an expected binary value subject to ignored bits specified in a bit mask. Depending on the result of the match 316, either "match" or "non-match" record 212 fields are considered. Depending on whether 318 the end of a match has been reached or not, a frame type output is provided and the process 300 starts anew in respect of another received packet, or the jump instruction is used to retrieve 312 to next record 212 in the decision table 210.

In accordance with the exemplary embodiment of the invention, because extracted packet header bits can be compared against either a specified comparison value subject/or not to a bit mask, the exemplary implementation of the exemplary embodiment of the invention, provides ternary match capabilities which enable bit value range matching.

In accordance with the exemplary embodiment of the invention, it is possible, if multiple header fields have short bit lengths and are relatively close to each other, a node 202 of the decision tree 200 may enable tests to be performed on multiple packet header fields simultaneously.

A template match engine 108 is employed to support processing of packets having a packet frame type not precoded in the hardware engine 104 or not expressible as a type-of of a recognizable packet frame type via the decision tree 200. The template match engine 108 provides complete flexibility in specifying packet header format templates for pattern matching against received packet headers. An exemplary implementation may provide support for at least 16 user specified frame types in addition to frame types detected by the hardware engine 104 and the decision tree parsing engine 106.

In accordance with an exemplary implementation of the exemplary embodiment of the invention, the template match engine 108 employs Ternary Content Addressable Memory (TCAM). An exemplary use of ternary content addressable memory in the field, is described in commonly assigned U.S. patent application Ser. No. 10/403,110, entitled "Configurable Ternary Content Addressable Memory", filed by RayChin Lu on Mar. 31, 2003, which is incorporated herein by reference. Packet header templates including a mask and a bit pattern, both of which are user configurable providing support for any frame format. As described above, it is possible for multiple frame types to be identified because the template match is subject to masked bits. The templates may be ordered such that the first template match will be taken as the relevant one. The template match engine 108 therefore provides full flexibility in specifying a packet header format pattern to be matched. The template match engine 108 also contributes to delaying obsolescence of the communication network node implementing thereof.

As the three frame type determination engines 104, 106, and 108 operate in parallel, the multiple frame type outputs are provided to a frame type output selector 110 which selects the frame type specification 114 to be employed in processing each packet through the pipeline 100. In general, frame type specification outputs from configurable engines are given precedence to the output of least configurable engines. The frame type output of the template match engine 108 is typically given a higher precedence to the frame type output of the decision tree parsing engine 106, and the frame type output of the decision tree parsing engine 106 is given a higher precedence to the frame type output of the hardware engine 104.

It is possible for all tree frame type determination engines not to recognize the frame type of a received packet, which may be due, for example, to new-standard packets being conveyed, an old standard packet type for which support has been disabled/discontinued, or a malformed packet being conveyed. Depending on the desired operation of the pipeline 100, packets for which a frame type cannot be determined are not processed through the pipeline 100 any further and are, without limiting the invention, either discarded, redirected, or sent to a management processor, if present, reducing the exposure of the rest of the pipeline 100 to the unnecessarily processing of such received packets. In accordance with an exemplary implementation of the exemplary embodiment of the invention, received packets whose frame types could not be determined are ascribed a frame type identifier reserved for unmatched frame types (e.g. hexadecimal value 0xFF).

Making reference to FIG. 1, stage 2 of the pipeline 100 is provided with the source port identifier 112, the packet header 102, and the ascribed frame type 114.

A packet header field value extractor 120 is employed to extract packet header field values from the packet header 102 based on extraction instructions specified in a frame type indexed record 122 of an extract table 124. For each frame type 114, the corresponding record 122 specifies the relevant packet header field offsets to enable field value extraction. Packet header format field relevancy is specified via a group of valid frame format bits. As mentioned above and without limiting the invention, in accordance with an exemplary implementation, stage 1 of the pipeline 100 may be discriminate between at least 256 frame types, therefore the extract table 124 may include at least 256 corresponding record 122 entries.

The following is representative of an exemplary frame type indexed information extraction record 122:

| | | | Valid Frame Format bits | | | | | | | | |
|---|---|---|---|---|---|---|---|---|---|---|---|
| Frame | Defaul | Mtype | TCP - V | Us-DEF - V | UDP - V | L4 - V | IP - V | Ethernet | SAP - V | VLAN - V | MAC - V |
| | | | | | | Extract Field Offsets | | | | | |
| | | | Frame | Defaul | Mtype | TCP | L4 | L4 | IP | Ethernet | SAP | VLAN Group | MAC Group |

Simply put, the header field value extractor 120, consults a frame type indexed record 122 to extract packet header field values corresponding to each valid frame format bit set, starting at the corresponding offset. The following is an exemplary list of field values extracted from received packet headers if valid for corresponding specific frame types 114:
  Destination MAC (6 Bytes);
  Source MAC (6 Bytes);
  DSAP (1 Byte);
  SSAP (1 Byte);
  Ethernet Type (2 Bytes);
  VLAN ID (12 bits);
  802.1p Priority (3 bits);
  TOS (1 Byte);
  TTL (1 Byte);
  Protocol ID (1 Byte);
  IP CHKSUM (2 Bytes);
  SRC_IP (4 Bytes);
  DES_IP (4 Bytes);
  SRC L4 Port (2 Bytes);
  Destination L4 Port (2 Bytes);
  UDP/TCP CHKSUM (2 Bytes); and
  User Define/TCP Flag (1 Bytes).

It may be apparent that records 122 in the extract table 124 only specify valid fields for each frame type, and for each valid field only the offset is specified. However, the above list of packet header fields also shows in parentheses field lengths. The inclusion of field length specifications for valid fields in the records 122 is left to design choice: specifying field lengths in the records 122 requires storage space, alternatively the packet header field extractor 120 may make assumptions regarding the lengths of packet header fields.

In accordance with another exemplary implementation of the exemplary embodiment of the invention, the packet header field extractor 120 does not physically extract field values from packet header fields just to then store them again in registers separate from the packet header 102. As the packet header 102 remains available to all stages of the pipeline 100, the packet header field extractor 120 associates a "pointer template" to each received packet based on the frame type 114 or the Mtype 126 and provides a packet header, pointer template, and Mtype triplet to subsequent stage stages of the pipeline 100. As modules and/or processes of subsequent stages have a need to inspect the packet header filed values, the modules and/or processes consult the pointer template associated with each packet processed to inspect packet header filed values directly. An exemplary the pointer template includes a memory address pointer to the beginning of the packet header 102 and the valid offset values specified in a corresponding extract record 122. The benefits of such implementations include space savings as packet header information is stored only once.

In accordance with the exemplary embodiment of the invention, each record 122 further specifies a match type 126 (Mtype) for packet classification. The frame type specification 114 relates to the format of a packet for purposes of extracting packet header values, whereas the match type specification 126 is used for packet classification. Multiple frame types 114 may be mapped to a single match type 126.

In accordance with the exemplary embodiment of the invention, each record 122 further specifies whether a default packet processing action 128 is to be performed in respect a particular frame type:

00: use the default port action: (default);
01: forward to CPU;
10: filter: Discard the packet; and
11: (invalid/reserved).

In accordance an exemplary implementation of the exemplary embodiment of the invention, the default port action 128 is specified in a register on per-ingress port basis. Exemplary default port actions 128 include:

00: use L2/L3 search result: (default);
01: forward to CPU;
10: filter: Discard the packet; and
11: (invalid/reserved).

The extracted field 130 values together with the match type 126 and the preliminary action 128, are provided to the stage 3 of the pipeline 100 for L2 and L3 searching. The preliminary action may be modified by a subsequent stage in the pipeline 100.

Stage 3 exemplary includes three search engines performing different search tasks: L2 Searching, Protocol VLAN searching, and L3 Searching.

The L2 search engine 132 employs a hashing search algorithm described in the above mentioned, commonly assigned, U.S. Pat. No. 6,697,873 B1 entitled "High Speed MAC Address Search Engine" issued Feb. 24, 2004 to Yik et al. (some of which are named inventors herein), letters patent '873 is incorporated herein by reference. In summary, the L2 search engine 132 provides the following functions:

Source MAC ADDR learning: either the extracted source MAC ADDR 130 by itself, or the source MAC ADDR and VLAN ID combination (130) are used as keys to perform a lookup in a L2 switching table of a L2 switching database via the hashing scheme described in the '873 U.S. patent:

If the lookup does not identify a corresponding entry, a L2 switching database entry is created in the L2 switching table (The learned MAC ADDR may also be reported to a management processor); and If the lookup does identify a corresponding entry, an aging bit associated with the entry is updated;

A destination port search is performed based on either the extracted destination MAC ADDR 130, or the destination MAC ADDR and VLAN ID combination (130) which are used as keys to perform a lookup in the L2 switching table of the L2 switching database via the hash scheme described in the '873 U.S. patent:

If the lookup does not identify a corresponding entry, the received packet is flooded to all the ports. If the received packet has an associated VLAN ID, flooding is limited to ports associated with the same VLAN domain, ports associated with the same VLAN domain are specified via a VLAN table.

If the lookup succeeds then the packet is sent only to the correct port(s). If the packet has an associated VLAN ID, the relevant ports are the ones associated with the same VLAN domain.

The L2 switching database includes entries having the following exemplary format:

| Name | Description |
| --- | --- |
| T stamp | Timestamp used to control entry aging. If the Timestamp is not updated within a predefined time period. The entry can be removed. |
| Address | 1. For L2 Frames - MAC ADDR<br>2. For L3 Multicast frames - IP ADDR & VLAN ID |
| Port Number/ Multicast Group | For a unicast packet, the field indicates the associated port number or the trunking port of the MAC ADDR. (A trunking port is a logic port corresponding to multiple physical ports) For L2 multicast and IP multicast packets, the field indicates the multicast group ID, to which the packet belongs. Based on this group ID, the search engine performs a look-up in a multicast group table to obtain the group of destination egress ports. |
| TYPE | Entry status:<br>000 - Invalid<br>001 - Dynamic MAC entry data structure<br>010 - IP multicast data structure<br>011 - Static MAC data structure<br>100 - L2 multicast<br>101 - Static MAC data structure with source and destination filter<br>110 - Static MAC data structure with source filter<br>111 - Static MAC data structure with destination filter |
| Priority | Priority |
| Discard bit | Discard the multicast packet |

The L2 search engine 132 retrieves/derives switching information from the L2 switching database, the switching information, without limiting the invention, including: egress port bitmaps, a VLAN ID to be ascribed to the received packet, a bit map specifying a VLAN ID specific handling action (insert, replace, remove, ignore, etc.), a transmission priority, a drop priority, multicast or unicast forwarding specification, etc. the switching information is to be employed in formulating a packet processing response for handling the received packet.

For multicast packets, the L2 search engine 132 needs to obtain an egress port specification corresponding to the group ID by performing a lookup in a multicast group table having exemplary group ID indexed entries specifying group memberships via exemplary 31 bit entries as follows:

| 31 | 30-28 | 27-00 |
|---|---|---|
| Management Processor Port | Reserved | Port bitmap for ports 00 to 27 |

Without limiting the invention, the multicast group table may include at least 256 entries.

The source and destination MAC ADDRs are mapped by the L2 search engine 132 to corresponding source MAC_IDX and destination MAC_IDX specifiers, which will be used by the packet classifier engine 142 at stage 4.

In accordance with the exemplary embodiment of the invention, stage 3 further includes a L3 search engine 134. The L2 search engine 132 and the L3 search engine 134 operate in parallel. The L3 search engine 134 performs layer-3 search operations by looking up the next hop router information in a L3 switch database using the extracted destination IP address as a key. The L3 switching database includes an L3 IP switching table and an range matching table. The information retrieved during the L3 switching database lookup is employed in mapping the extracted source IP ADDR and destination IP ADDR to an index value which will be provided to stage 4 to be used by the classifier 142.

The L3 switching database lookup is performed to determine routing information in respect of the received packet. The L3 switching database lookup includes performing two searches: to obtain an exact match and to determine a range match.

The exact match search is described in commonly assigned U.S. patent application Ser. No. 10/750,455 entitled "High Speed MAC Address Search Engine" filed Dec. 31st, 2003 by Barrak et al. (some of which are inventors named herein), the U.S. application is incorporated herein by reference. In summary, in performing the L3 search, destination IP ADDRs are hashed to a hash index. The hash index is used to reference entries in the L3 switching database.

Each L3 switching database entry includes the following exemplary information:

| Name | Description |
|---|---|
| Aging Bit | Indicates that a recent successful search matched on this entry |
| V | Entry validity indication |
| IP | IP ADDR to be matched |
| Link Pointer | Link to the list of similarly hashed entries |
| | Next hop router information |
| Destination MAC ADDR | New destination MAC address |
| VLAN ID | Egress VLAN ID |
| XP | Priority field for VLAN TAG |
| T port vector | Indicates whether or not a VLAN tag should permitted on the way out |
| Port Number Group | Port number or trunk group number for egress |
| Counter IDX | Counter number for statistics (stage 5) |

In searching the L3 switching database, IP ADDRs are compared with the IP ADDRs stored in correspondingly indexed entries.

If and IP ADDR match is found, the L3 search complete and the following actions are performed:
the corresponding next-hop router information is obtained;
a L3 counter index is provided for updating L3 transmission counters at stage 5;
the aging bit of the L3 switching database entry is updated indicating that the entry was used recently; and
the matched entry is used as the IP_IDX for packet classification at stage 4.

If an IP ADDRs match is not found, it may mean that multiple IP ADDRs are hashed into the same hashing index. The L3 switching database entry would then have a valid link pointer to a first entry of a list of entries. The list is parsed to find a match.

If the list does not contain a match for the IP ADDR, an indication is provided regarding the failure of the exact match. Failing to find an exact match, the result of a L3 range search is considered.

The L3 range search emulates a longest prefix match scheme. Entries of an IP range match table of the L3 switching database includes an IP ADDR specification, and an IP mask associated with a range of IP ADDRs. The IP mask specifies the IP range (typically an IP subnet) for comparison:

| Name | Description |
|---|---|
| Aging Bit | Indicates that a recent successful search matched on this entry |
| V | Entry validity indication |
| IP | IP ADDR to be matched |
| IP_Mask | IP mask/netmask/relevant bits |
| | Next hop router information |
| Destination MAC | New Destination MAC ADDR |
| VLAN | Egress VLAN ID |
| XP | Priority field for VLAN TAG |
| T port vector | Indicates whether or not a VLAN tag should permitted on the way out |
| Port Number Group | Port number or trunk group number for egress |
| Counter IDX | Counter number for statistics (stage 5) |

Without limiting the invention, the IP range match table of the L3 switching database may include 64 entries, more entries may be used as required depending on the application.

The bits of extracted destination IP ADDR are compared with the bits of the IP ADDRs stored in the L3 switching database entry and the result is subjected to the IP mask. The mask is specifies the relevant bits, and if the relevant bits match then the range match is positive.

If an L3 range match is found, the same actions performed in respect of the L3 exact match apply. If no entry was matched, the L3 range match is said to have failed.

If both L3 exact match and L3 range match are successful, the exact match takes priority over the L3 range match. If no matches are found, the routed packet is typically forwarded to management processor for further processing.

In the above description, destination IP searches to resolve a switch response for L3 routed packets was described. In accordance with the exemplary embodiment of the invention, for all IP packets, including routed and bridges packets, the L3 search engine 134 also tries to search the L3 switching database for source IP ADDRs to map 32 bit IP address into an IP_IDX typically having a smaller number bits, (such as 12 or 14 bits). The mapping of IP ADDRs into corresponding IP_IDX' is employed to reduce implementation costs of the classification stage 4.

In accordance with the exemplary embodiment of the invention, an option is provided for associating a VLAN tag with a packet's PROTOCOL specification, the PROTOCOL being identified by the value of the Ethertype or DSAP/SSAP fields of the packet header. The Protocol VLAN search engine 136 determines the Ethertype for Ethernet-II and SNAP received packets, or the DSAP/SSAP for other Logical Link Control (LLC) packets. In accordance with an exemplary implementation of the invention, at least 16 configurable Ethertypes or DSAP/SSAP that can each be associated with a VLAN ID. The Protocol VLAN search engine 136 performs operations on extracted packet header field values, including matching extracted field values against know patterns:

No actions are taken if a match is not found for a received packet which means that the packet does not have a VLAN tag/association. In accordance with an exemplary implementation, when a match is not found a default VLAN ID may be assigned;

If a match is found, the received packet is ascribed a VLAN IDX corresponding to a specification derived from an associated matched entry;

The index and Port ID 112 are used as lookup keys in querying a Protocol VLAN table to determine the outgoing VLAN Tag; and The VLAN ID (Tag) is replaced on match.

An exemplary Protocol VLAN Table includes:

| | 63 | | 32 | 31 | | | 0 |
|---|---|---|---|---|---|---|---|
| For CPU port | CPU port VLAN IDX to VLAN ID mapping | | | | | | |
| For ports 31-2 | port 31 VLAN IDX to VLAN ID mapping ... port 2 VLAN IDX to VLAN ID mapping | | | | | | |
| Port 1 | VLANID/IDX 15 | VLANID/IDX 14 | | VLANID/IDX 13 | | | VLANID/IDX 12 |
| | VLANID/IDX 11 | VLANID/IDX 10 | | VLANID/IDX 9 | | | VLANID/IDX 8 |
| | VLANID/IDX 7 | VLANID/IDX 6 | | VLANID/IDX 5 | | | VLANID/IDX 4 |
| | VLANID/IDX 3 | VLANID/IDX 2 | | VLANID/IDX 1 | | | VLANID/IDX 0 |
| Port 0 | VLANID/IDX 15 | VLANID/IDX 14 | | VLANID/IDX 13 | | | VLANID/IDX 12 |
| | VLANID/IDX 11 | VLANID/IDX 10 | | VLANID/IDX 9 | | | VLANID/IDX 8 |
| | VLANID/IDX 7 | VLANID/IDX 6 | | VLANID/IDX 5 | | | VLANID/IDX 4 |
| | VLANID/IDX 3 | VLANID/IDX 2 | | VLANID/IDX 1 | | | VLANID/IDX 0 |

Note that the VLAN IDX and VLAN mapping are provided on per ingress port basis. Therefore, different VLAN ID can be assigned for the same protocol on different ports.

In accordance with the exemplary embodiment of the invention, the L2 and L3 search engines 132 and 134 in combination provide switching information from the matched switching database entries in support of formulating at least a preliminary switch response 140 for the received packet. The information available after stage 4 processing completes supports the formulation of a switch response based on: the ingress port ID, extracted packet header information, switching information extracted from the L2 switching database, switching information extracted from the L3 switching database, and information derived from the Protocol VLAN table. Exemplary information specified in the switch response includes:

| Field | Field Description |
|---|---|
| Original source port | Egress port which received the packet. |
| Transmission priority | Transmission priority of the packet, used for queuing and scheduling. |

-continued

| Field | Field Description |
|---|---|
| Drop precedence | Discard priority of the packet, used for WRED prior to queuing. |
| VLAN | Tag control, including user priority bits, CFI bit, and VLAN ID. |
| Use priority bits | Indicates that the L3 search engine 134 should output the priority bits stored in a descriptor tag, not the result of packet inspection or search. |
| VLAN tag in | Indicates that the received packet contains a VLAN tag header. |
| Multicast | Indicates that the received packet is a multicast packet. |
| Recalculate CRC | Indicates whether the CRC should be recalculated for this packet prior to transmission if the header has been modified. |
| Replace source MAC | Indicates that the source MAC address should be replaced for this packet prior to transmission (for L3 routed packets) |
| VLAN tag out bits | Indicates the egress ports via which a VLAN tagged packet must be transmitted. |
| Destination port bit map | Indicates the ports via which the packet must be transmitted. |
| Packet length | Length of the packet being stored, including header, data, and CRC. Does not include the packet descriptor length. |

The information in a switch response may be used to instruct the forwarding engines (described elsewhere) processing the received packet subsequent to stage 5 how to handle the packet.

In accordance with the exemplary embodiment of the invention, stage 4 classifies packets into packet flows by subjecting the multiple extracted fields to classification rules. The classification rules may be implemented as test values and associated test masks.

Recall that stage 2 extracts the multiple field values from the headers of received packets and different field values are extracted for different frame format types 114. In accordance with an exemplary implementation of the exemplary embodiment of the invention, the packet classification rules match different fields/fields values for different packet frame format types. Classification rules are specified in entries 146 of a classification rule table 144, and fields of the rule table may have different meanings dependent on the Mtype 126 associated with each rule. For example, if Mtype=1 corresponds to Ethernet-II/IP/TCP packets, and Mtype=2 corresponds to Ethernet-II IP/ICMP packets; then packet classification for Mtype=1, may exemplary be performed based on fields: Mtype=1, source Port ID (112), source MAC ADDR, destination MAC ADDR, source IP ADDR, destination IP ADDR, TCP source port, TCP destination port; while packet classification for Mtype=2, may exemplary be performed based on fields: Mtype=2, source Port ID (112), source MAC ADDR, destination MAC ADDR, source IP ADDR, destination IP ADDR, ICMP-code, ICMP-type. In accordance with the exemplary implementation of the exemplary embodiment of the invention, although the classification rule entry fields may have different meanings, for example, TCP source port vs. ICMP-code, it should not cause confusion since testing against classification rules is qualified by corresponding Mtype values.

The following is exemplary of the format of a classification rule table entry 146:

| Match fields | Description |
| --- | --- |
| Mtype | (See attached table for some pre-define match types) |
| Egress Port | Egress port: physical port or trunk port |
| Dest. MAC Index | L2 search engine 132 mapping/MAC table entry number |
| Source MAC Index | L2 search engine 132 mapping/MAC table entry number |
| VLAN ID | VLAN ID |
| Ether Type/ DSAP + SSAP | Ethernet Type for Ethernet-II and SNAP packets, or DSAP/SSAP for LLC packets |
| Source-IPv4 | L3 search engine 134 mapping: exact match or range match |
| Destination-Ipv4 | L3 search engine 134 mapping: exact match or range match |
| Protocol ID | IP protocol field |
| Source-L4 | Source UDP/TCP port |
| Destination-L4 | Destination UDP/TCP port |
| TCP-Flag/User Def. | TCP flag or User defined field |
| Weight | If multiple rules match, pick the rule with highest weight. |

In operation, the packet classifier 142 tests at least a subset of extracted packet header field values specified in the classification rule associated with the Mtype 126 associated with the packet against the classification rule by comparing the extracted field values with expected test values specified in the classification rule subject to corresponding test masks. In accordance with the exemplary implementation of the exemplary embodiment of the invention, when a classification rule match is found, classification rule entry 146 index in the classification rule table 144 is used as the packet flow ID.

In accordance with the exemplary embodiment of the invention, a weight is associated with each classification rule. When multiple rules are matched, a flow ID selector 148 associated with the packet classifier 142 classifies the received packet in accordance with the classification rule having the highest weight. If multiple entries 146 with the same weight are matched, then the highest entry with the highest classification rule table index is selected in determining the flow ID of the subject packet.

In accordance with the exemplary embodiment of the invention, to the extent possible, a preliminary action 128 is associated with a received packet as early as stage 2 to arrive at a switch response 140 for the packet. For example, a preliminary action 128 may be based on the ingress port at stage 2, and then the preliminary action is modified at stage 3 in accordance with switching information derived by the L2 search engine 132 from the L2 switching database, and by the L3 search engine from the L3 switching database.

L3 routing functionality is provided via the L3 search engine 134. However, in the packet classifier 142, provides the flexibility to offer L3 routing via IP range matching. Accordingly, the capacity of the IP range matches is extended by the packet classifier 142.

In accordance with an exemplary implementation of the exemplary embodiment of the invention, the Mtype specification 126 is employed in L3 routing IP range matching so to differentiate between rule based on a different meaning of matching fields. One way to address this situation is to assign Mtype+4 for new Mtype. That is when L3 search engine 134 cannot find a route in its L3 switch database and decides to utilize the packet classifier 142 to perform L3 search function, then the L3 search engine 134 adds 4 to the Mtype value and provides it along with the destination IP ADDR to the packet classifier 142. In accordance with an exemplary implementation, the packet classifier 142 may employ the full destination IP ADDR to match rules based on the new Mtype instead of using the IP index.

Figure 5:
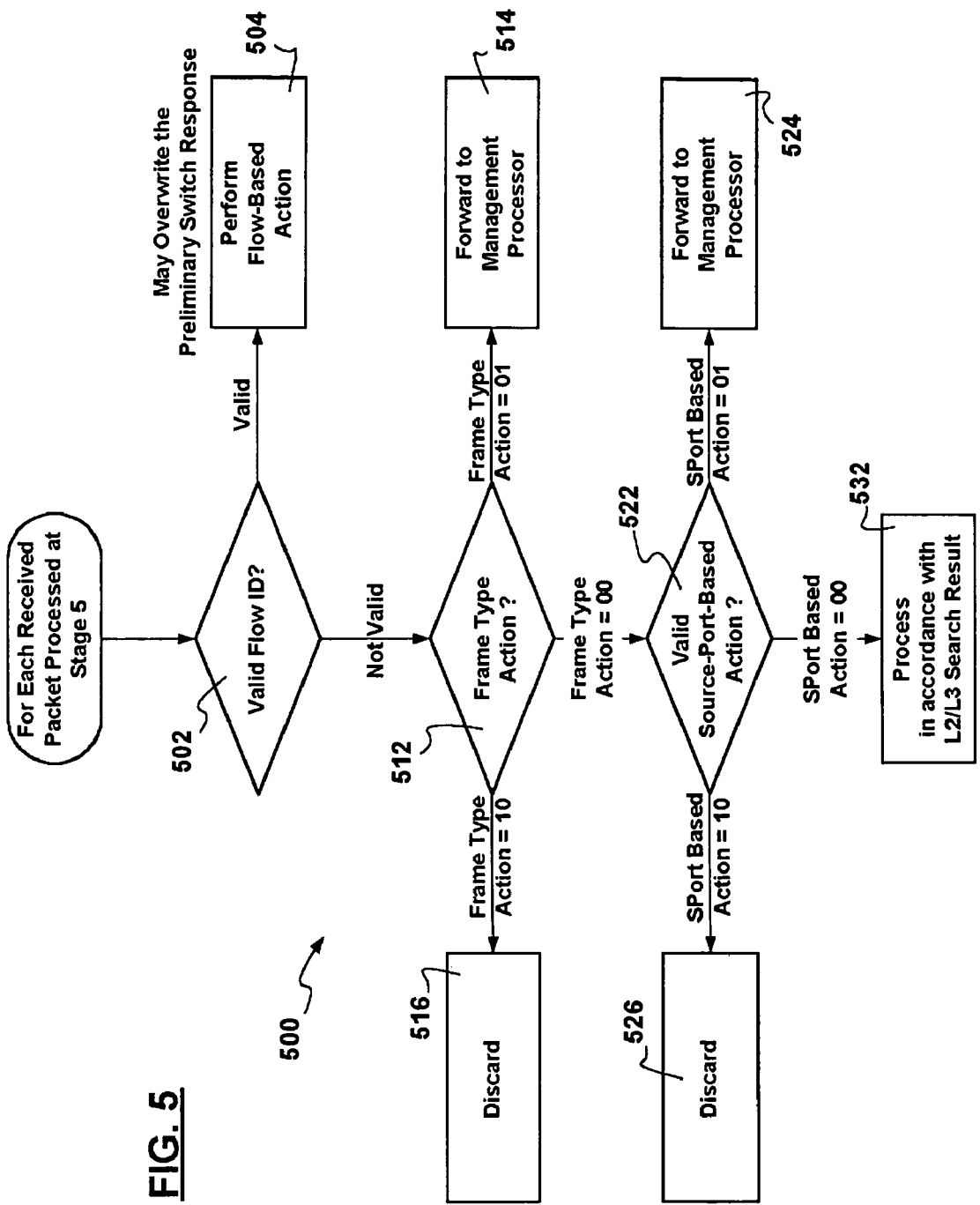
FIG. 5 is a diagram showing exemplary priorities in accordance with which actions are exemplary performed by stage 5 of the exemplary packet processing pipeline, in accordance with an exemplary implementation of the exemplary embodiment of the invention.

In accordance with the exemplary embodiment of the invention, actions 128 are performed at stage 5 of the pipeline 100. All actions 128 in respect of received packets can be categorized into: default port actions, frame type actions, L2/L3 actions, and flow actions which are assigned to received packets at different stages of the packet processing pipeline 100. A switch response may also have been associated with received packets. Performing actions 128 is subject to precedence rules as exemplary shown at 500 in FIG. 5.

Flow actions are given the highest precedence. Flow IDs are ascribed to packets if the packet classifier 142 successfully classifies 502 received packets at stage 4. The flow IDs are used to lookup flow actions in an action table 154. Once the appropriate flow action(s) and corresponding flow action parameters are retrieved from the action table 154, the flow actions are performed 504 on the packet and/or the packet header.

If no valid flow action has been associated with the received packet, precedence is given to frame type actions, if a valid frame type action 128 as been associated with the received packet at stage 2, derived as described above from records 122 of the extract table 124. The frame type action associated with the received packet is determined in step 512. Frame type actions 128 include forwarding 514 the received packet to the CPU, and discarding the received packet 516.

If the frame type action code of "00" is associated with the received packet, then precedence: is given to default port actions based on the source port on which the packets were received (based on the SPort ID 112). Valid port action code associated with the received packets, ascertained in step 522, include forwarding 524 the received packets to the CPU, and discarding the received packet 526. Depending on the implementation, default port actions may be ascribed to received packets or may be specified on a per-port basis in at least one default port action register.

If the default port action code of "00" is associated with the received packet, then, the packet is processed 532 in accordance with L2/L3 search results actions 128.

Figure 6:
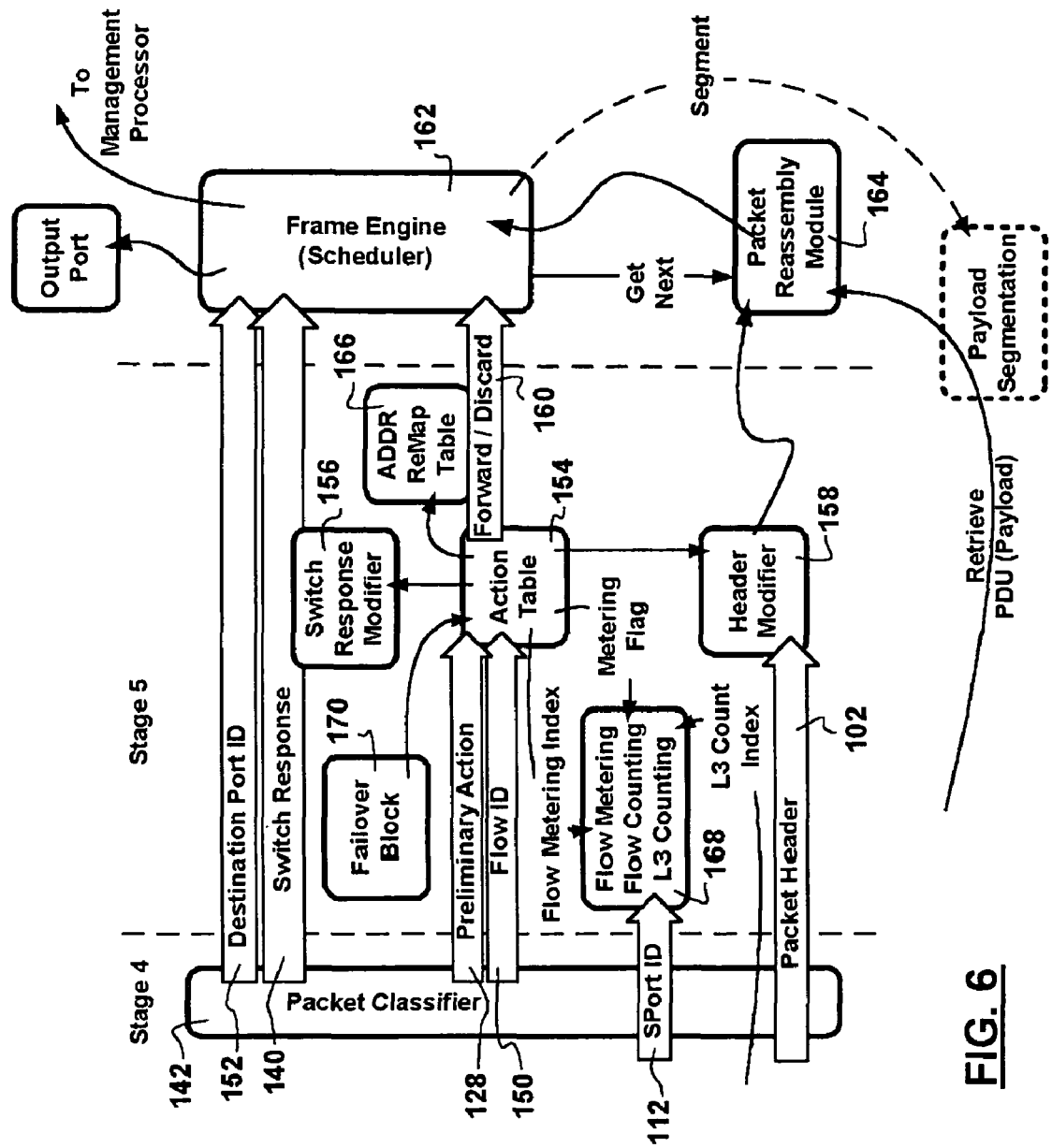
FIG. 6 shows details of an exemplary implementation of stage 5 of the exemplary packet processing pipeline, in accordance with the exemplary embodiment of the invention.

FIG. 6 shows details of an exemplary architecture of stage 5 of the pipeline 100. The flow ID 150 corresponding to the packet, and the preliminary action 128 are employed in consulting an action table 154 to determine actions to be performed on the packet. The preliminary switch response 140 perhaps including a destination port ID specification 152 is provided to a switch response modifier 156. The switch response modifier 156 operates in accordance with instructions derived from information specified in the action table 154 to provide a definitive switch response 140 to a frame engine 162. The packet header 102 is provided to a packet header modifier. The packet header modifier 158 modifies the packet header 102 in accordance with instructions derived from information specified in the action table 154. Once the packet header 102 is modified, a packet reassembly module 164 formulates a new packet to be transmitted via an output port, the new packet including the packet payload and the modified packet header 102.

Each entry of the flow action table 154 includes the following exemplary information:

an action code which specifies what action to be performed on the packet/packet header;
a Replace VLAN ID ENABLE specification used to enable packet header VLAN ID replacement;
a VLAN ID specification used when VLAN ID replacement is enabled;
a Forwarding INDX/DEST BIT MAP field which has multiple meanings based on the action code:
  i. the destination port bit map indication,
  ii. denotes the forwarding index to the IP and MAC information when the action includes remapping IP and MAC headers,
  iii. heartbeat field indication when the action includes heart beat detection,
an Enable XP remap specification specifies transmission priority and dropping priority replacement;
an XP field specifies the new transmission priority;
a DP field specifies the new dropping priority;
a Snoop_Enable specifies packet forwarding to the snoop port;
a Snoop_Port_ID field specifies the snoop port;
a Remap_TOS/DSCP_Enable specifier specifies TOS/DSCP field replacement in the IP header;
a TOS/DSCP field specifies the TOS/DSCP value to be replaced;
an 802.1p Remap_Enable specifier specifying 802.1p (VLAN priority) field replacement in the packet header;
an 802.1p field specifies the VLAN priority value to be used in replacing the 802.1p field value;
a Metering_Enable specifier used to enable metering function for the flow;
a Counting_Enable specifier used to enable counting function for the flow; and
a Metering/Counter_Index specifier indicated a meter or counter ID.

The following are exemplary details of six exclusive flow actions:

L2/L3 Forwarding (action code 000) takes as parameters a destination bit map and overwrites the destination port bitmap specified in the preliminary switching response 140 provided at stage 3 of the pipeline 100. The packet header is modified in the same way a packet would be modified in accordance with a L2/L3 search result (as described below).

Forward to CPU port (action code 001) changes the destination bitmap to specify forwarding the packet to the CPU port.

Filter packet (action code 010), may take as a parameter an instruction to update a filtering counter implementing the counting of dropped packets. The preliminary switch response 140 is modified to set the filter bit on. The packet is dropped.

Heartbeat detection (action code 011): If a heartbeat packet is received, then the session ID, type, and mode are sent to a fail-over module to be processed (the operation of the failover module is described elsewhere). The preliminary switch response 140 is modified to set a Failover packet bit on, which indicates that the packet is a heartbeat packet. Other modifications include replacing the destination port map specification and the packet is forwarded to the failover module (not shown) for further processing.

Flow actions MAC ADDR remapping, IP ADDR remapping, and L3 remapping share the same database shown in FIG. 6 to be implemented as a ADDR remap table 166, but referred to herein below as the MAC ADDR remapping database 166, IP ADDR remapping database 166, and L3 remapping database 166, respectively. Entries in the ADDR remap table 166 include a destination IP ADDR specification, a destination bitmap, a VLAN "tagout" bitmap specification (see T port vector above), a VLAN ID specification, and a destination MAC ADDR.

MAC ADDR re-mapping (action code 100) takes as parameters an index to a failover data flow (see below), and three FLOV bits which define the failover enable for MAC and IP remapping. FLOVF-E, the Failover Function Enable bit is set by CPU to turn on the failover functionality. FLOVE-H, the Hardware Enable bit is set the session failure is detected by the failover module (as described elsewhere). And, FLOVE-S, the software enable bit is set by the CPU when the CPU detects a session failure. Failover/Remap ON means that FLOV-E=1 AND (FLOVE-H OR FLOVE-S)=1 If the Failover/Remap is OFF the preliminary switching response 140 is not modified. If however the Failover/Remap is ON, the index is used to perform lookup in a MAC remapping database 166 to retrieve the information such as: replacement destination bitmap, replacement VLAN ID and VLAN priority, and replacement outgoing VLAN tag bitmap, form a remapping table. Modifications to the preliminary switch response 140 include: replacing the destination bitmap, replacing the VLAN ID, replacing the VLAN priority, replacing VLAN "tagout" bitmap (see T port vector above), and recalculating the CRC. Modifications to the packet header include replacing the destination MAC ADDR.

Regarding failover functionality provided by a failover block 170, if an incoming packet is associated with a flow ID 150 for which address remapping is required, and if a failure has been detected and recorded for that flow ID 150, then the packet is to be forwarded differently, which includes forwarding the packet to a different destination address, than if there had been no failure. The FLOV bits are used to identify whether or not there has been a failure. If not, then forward normally. On failure, the index stored in a corresponding row of the flow action table 154 is used as a pointer to a row of the remapping table 166 which contains alternate forwarding information to be used.

IP ADDR re-mapping (action code 101) takes as parameters an index to the failover data flow, and three failover bits as described above. If Failover/Remap is ON, the index is used to perform a lookup in an IP remapping database 166 to retrieve information such as: a destination bitmap, a next hop destination MAC ADDR, a VLAN ID/TAG, an outgoing VLAN tag bitmap, and a destination IP address, which are used to modify the preliminary switch response 140 and the packet header 102. Dependent upon the packet type, there are four different scenarios for modifying the packet header 102 and the preliminary switch response 140 which are summarized in the following table:

| Scenarios | Packet header field modifications | Preliminary switch response modifications |
|---|---|---|
| If the packet is an IP bridge packet (not a Routed packet) and not UDP or TCP packet (Replace Destination IP ADDR) | Replace destination MAC ADDR Replace destination IP ADDR Recalculate IP checksum | Replace destination bitmap Replace VLAN ID Replace VLAN "tagout" bits Set/Recalculate CRC |
| If the packet is an IP bridge packet and it is UDP or TCP packet (Replace Destination IP ADDR & recalculate TCP/UDP checksum) | Replace destination MAC ADDR Replace destination IP ADDR Recalculate IP checksum Recalculate UDP/TCP checksum | Replace destination bitmap Replace VLAN ID Replace VLAN "tagout" bits Set/Recalculate CRC |
| If the packet is an IP Routed packet and not UDP or TCP packet (Perform routing functions and replace the Destination IP ADDR) | Replace destination MAC ADDR Decrease TTL by one Replace destination IP ADDR Recalculate IP Checksum | Replace destination bitmap Replace VLAN ID Replace VLAN "tagout" bits Set/Recalculate CRC Replace source MAC ADDR |
| If the packet is an IP Routed UDP or TCP packet (Perform Routing functions, replace Destination IP ADDR and recalculate TCP/UDP checksum) | Replace destination MAC ADDR Decrease TTL by one Replace destination IP ADDR Recalculate IP Checksum Recalculate UDP/TCP checksum | Replace destination bitmap Replace VLAN ID Replace VLAN "tagout" bits Set/Recalculate CRC bit Replace source MAC ADDR | where an IP Routed packet relates to a packet subject to L3 router. In general, L3 routing, an index specified in the flow action table 154 may be employed to point to an entry in a routing table in providing L3 routing.

L3 Routing (action code 110) takes as parameters an index to a routing entry. The index is used to extract a destination bitmap, a destination MAC ADDR, a next hop destination MAC ADDR, and VLAN information form the remapping table 166. Modifications to the preliminary switch response 140 include: replacing the destination bitmap, replacing the VLAN ID, replacing the VLAN priority, replacing VLAN "tagout" bitmap, and recalculating the CRC. Modifications to the packet header include: replacing the destination MAC ADDR with the next hop MAC ADDR, decreasing the TTL by one, and updating the IP checksum.

The following actions can coexist each other and can also coexist with the above flow actions.

XP and Dropping Priority (DP) replacement: The XP and DP can be redefined by the CPU for each flow. If XP_replace is set to 1, then the preliminary switch response 140 is modified to replace the XP and DP values.

Snooping: the preliminary switch response 140 is modified to add the snoop port as one of the output ports to which the packet will be forwarded by turning on the bit corresponding to the snooping port in the destination bitmap. It is also ensured that the multicast bit is set in forwarding the packet.

TOS/COS remapping: The packet header 102 is modified by replacing the TOS/COS field based on a provided TOS/DSCP value. The CRC and the IP checksum must be recalculated because the packet header 102 was modified.

802.1P remapping: The 802.1p field if the preliminary switch response 140 is modified with a new VLAN Tag. The CRC must also be recalculated.

802.1Q VLAN ID replacement: The 802.1Q VLANID of the preliminary switch response is replaced with an 802.1Q VLAN ID value. The CRC must also be recalculated.

Figure 7:
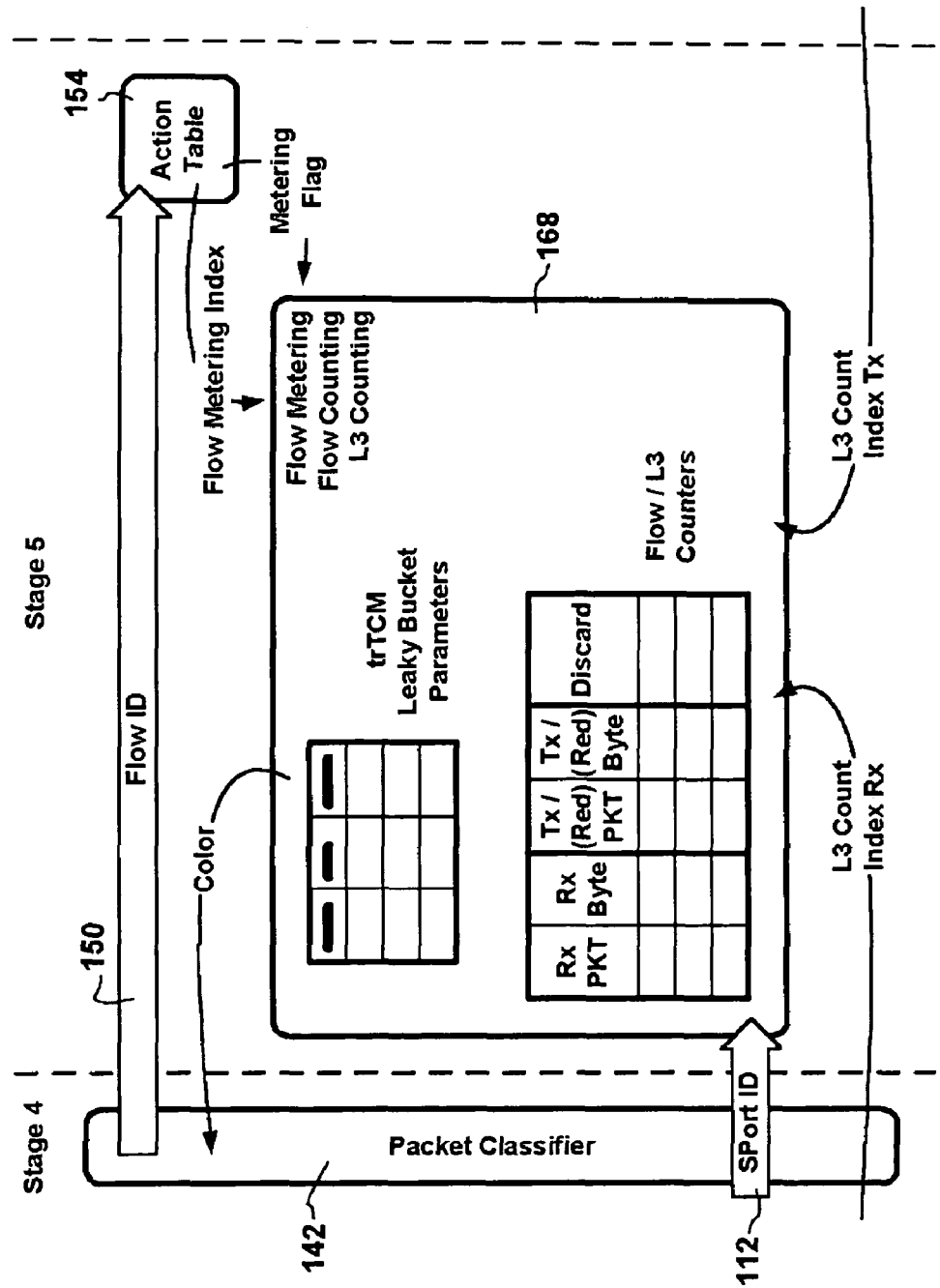
FIG. 7 shows further details of a metering and counting module implementation, in accordance with the exemplary embodiment of the invention.

Making reference to FIG. 7, both rate metering and packet counting can be activated and deactivated independently.

Rate Metering: A metering index is provided to a metering module 168. the metering module 168 tracks traffic flows based on the metering index. If a traffic flow exceeds a specified peak rate, then, the metering module 168 reports condition red. If the traffic flow is below a specified average rate, then the metering module 168 reports condition green. Otherwise, the reported condition is yellow. The preliminary switch response 140 is modified based on a color specification reported by the metering module 168. If color is red ("10"), the filter bit set, which effectively marks the packet to be discarded. If return color is yellow ("01"), the drop precedence is set, results in dropping the packet in accordance with precedence rules. No corresponding modifications to the preliminary switch response are made if the color is green ("00").

Counting: providing the metering module 168 with the metering index may also enable counting. Counters corresponding to the number of transmitted packets and transmitted bytes are incremented if the flow condition is not red. If the flow condition is red, a discard counter is incremented.

Detailed functionality of the flow metering and counting block 168 includes:

In accordance with an exemplary implementation of the exemplary embodiment of the invention, a two rate three color marker (trTCM) scheme, which is a IETF standard, is used to meter traffic on per flow basis. In accordance with the exemplary embodiment of the invention, the scheme is exemplary implemented using two leaky buckets in accordance with flow Peak Information Rate (PIR) and Max Peak Burst size, and Committed Information Rate (CIR) (Mean rate), and Max Mean Burst size, respectively.

For every packet which requires flow metering, the flow metering module 168 uses the metering index to update corresponding flow leaky bucket counters. The metering module returns the green, yellow or red condition of the flow as follows:

Red: if the traffic flow exceeds the PIR,
Yellow: if the traffic flow exceeds the CIR but conforms to the PIR, and
Green: if the a traffic flow conforms to the CIR.

Per flow counters are exemplary held in entries of a metering index indexed table, each entry having: a received packet counter, a received bytes counter, a transmitted or red packet counter, a transmitted or red byte counter, a packet discard counter. The "transmitted" counters are used for counting L3 switched packets processed based on a L3 action, while the "red" counters are used for classified packets processed in accordance with determined flow IDs 150.

As described above, packets not associated with a flow ID 150, may be processed in accordance with actions corresponding to L3 search results. In that case the flow metering and counting module 158 is provided by the L3 search engine with a source counter index and destination counter index.

The metering and counting module 158 uses the source index to update the corresponding receive counter while updating the transmit counter using a destination index. If the filter bit the switch response 150 is set, then the discard counter is updated instead of the transmit counter.

Recall that the L3 search engine 134 may not find the source IP address in the L3 switching database and therefore would not be able to provide the source counter IDX. In accordance with the exemplary embodiment of the invention, for such packets, the source port is used as an index to update a L3 default source port counter.

Flow Counter updates are performed when the packet classified with respect to a packet flow, the flow action may also require a counter update by setting the counter bit. The metering and counter module 168 uses the flow counter index to update the associated RX counters.

The metering and counting module 168 also keeps track of the number of red (discarded) packets for ingress rate metering. If its color is red, the metering and counting module 168 also updates packet discard counters, (which shares the same field with a transmission counter as described above to achieve space efficiency.)

Recall that flow action code 000 is similar to a L3 action for routed packets. The following processing needs to be performed on such packets. The packet header 102 needs to be modified to: replace destination MAC ADDR with the MAC address of the Next hop router, which is the destination MAC ADDR derived by the L3 search engine 136, which can be further overwritten by the destination MAC ADDR derived from the MAC ADDR remapping table 166 if the packet is associated with a flow ID 150 by the packet classifier 142. The TTL is decreased by one, the IP_CHKSUM is updated. Modifications to the preliminary switch response 150 include setting the L2 CRC recalculate flag and overwriting the VLAN ID specification. Note that the following L3 actions are performed by the L3 search engine 134: discarding the packet if TTL>1, and the replace source MAC ADDR bit is set in the preliminary switch response 140.

In accordance with the exemplary embodiment of the invention, a flexible header parsing scheme is provided, wherein three header parsing engines are employed in parallel to determine various frame types based on inspecting specified packet header bit patterns for incoming packets at full line rate. Employing three header parsing engines provides flexibility: a hardware engine provides fast frame type identification for standard well-known frame types, a decision tree parsing engine, and a configurable template match engine.

In accordance with the exemplary embodiment of the invention, packet header field values are extracted from the packet header after frame type determination which ensures minimum and fast preprocessing. A user configurable field extractor is employed, via which the offsets of at least one field may be specified in respect of each frame type. For some packet types, a packet processing action may be determined at this early stage in the pipeline.

In accordance with the exemplary embodiment of the invention, implementation costs are reduced by mapping Layer-2 source and destination MAC addresses, and Layer-3 source and destination IP addresses into an internal index used in searching address tables. A combined L2 and L3 search engine employs a hashing-based search scheme to map extracted network addressing field values into an index having a short bit length.

In accordance with the exemplary embodiment of the invention, actions are ascribed to classified packets, including, but not limited to: Virtual Local Area Network IDentifier (VLAN ID) insertion, VLAN re-mapping, Type-of-Service (TOS) re-mapping, Quality-of-Service (QoS) enforcement, filtering, forwarding, and header modification.

It is understood that the sized of each of the databases, tables, lists, entries, fields, and registers mentioned herein have associated memory storage space requirements. The sizes of the databases, tables, lists, entries, fields, and registers are left to design choice which would take in consideration costs associated with providing the necessary storage space therefor.

The embodiments presented are exemplary only and persons skilled in the art would appreciate that variations to the above described embodiments may be made without departing from the spirit of the invention. The scope of the invention is solely defined by the appended claims.

We claim:

1. A packet switching node having a pipelined packet processing architecture for processing packets received via a plurality of packet switching node source ports, the packet switching node comprising:
   a. a plurality of packet frame type determination engines configured to be employed in parallel for determining a packet frame type of a packet received via an input port of the packet switching node prior to extraction of packet header field values, wherein the plurality of packet frame type determination engines comprise:
      a hardware frame type identification engine having hardware logic for inspecting packet header bit values and hardware logic for recognizing standardized packet header bit patterns;
      a successive frame type elimination engine having hardware logic for conditionally subjecting packet header field values successively to a plurality of rules; and
      a template match frame type identification engine including a plurality of packet header templates for comparison against packet header regions,
      wherein frame type determinations by the successive frame type elimination engine and the template match frame type identification engine are prioritized over a frame type determination by the hardware frame type identification engine;
   b. a packet header field value extractor for selectively extracting, without intermediate processing, packet header field values from the plurality of packet header field values conveyed by each packet based on the source port via which the packet was received;
   c. means for ascribing a match type to the packet, the match type preclassifying the packet based on the extracted packet header field values irrespective of the format of the packet frame;
   d. means for searching one of packet switching information, packet routing information, and protocol virtual local area networking information tracked by the packet switching node based on one of extracted packet header field values, the match type, and the source port for formulating a preliminary switch response for the packet; and
   e. a packet classifier for classifying the packet into one of a plurality of packet processing flows based on one of the source port identifier, the preliminary switch response, extracted packet header field values, and the match type.

2. A packet switching node as claimed in claim 1, wherein the successive frame type elimination engine comprises one of:
   a. a decision tree parsing engine per source port; and;
   b. a decision table per source port, each decision table having a plurality of decision table records, each decision tree record specifying a packet header offset of a frame type identification bit pattern, a frame type identification test bit pattern, and one of a jump instruction specifying the decision table row index of a subsequent decision table record and a frame type identifier.

3. A packet switching node as claimed in claim 1, further comprising a frame type selector for selecting a frame type when at least two of the hardware frame type identification engine, the successive frame type elimination engine, and the template match frame type identification engine identify differing frame types.

4. A packet switching node as claimed in claim 1, wherein the header field value extractor further comprises an extraction lookup table having a plurality of frame type indexed extraction table records, each record specifying packet header field offsets.

5. A packet switching node as claimed in claim 4, wherein the means for ascribing a match type comprises a match type specifier for each extraction table record.

6. A packet switching node as claimed in claim 5, wherein the header field value extractor further comprises means for ascribing a preliminary action to be performed in respect of the packet, each extraction table record further comprising a preliminary action specifier.

7. A packet switching node as claimed in claim 1, wherein the header field value extractor further comprises means for ascribing a preliminary action to be performed in respect of the packet.

8. A packet switching node as claimed in claim 1, wherein means for searching one of packet switching information, packet routing information, and protocol virtual local area networking information comprises:
   a. a Layer-2 search engine interacting with a switching information database;
   b. a Layer-3 search engine interacting with a routing information database; and
   c. a virtual local area networking search engine interacting with a virtual area networking table.

9. A packet switching node as claimed in claim 1, wherein the packet classifier further comprises a classification rule table having classification rule entries, each classification rule entry having a match type specific format, each classification rule entry specifying a processing flow identifier to be conditionally associated with the packet if the conditions specified in the entry are met, each classification rule entry optionally specifying a rule weight specifying the precedence of the rule entry.

10. A packet switching node as claimed in claim 1, further comprising:
   a. means for determining an action to be taken based on one of the source port, the frame type, and the processing flow classification;
   b. a switch response modifier selectively modifying the preliminary switch response in accordance with the action;
   c. a packet header modifier selectively modifying the packet header in accordance with the action; and
   d. means for processing the packet in accordance with the switch response.

11. A method for processing packets received via a plurality of source ports of a packet switching node having a pipelined packet processing architecture, the method comprising:
   a. determining, by a plurality of frame determination engines, a frame type of packets by:
      1. inspecting, by a hardware frame type identification engine, packet header bit values and recognizing standardized packet header bit patterns;
      2. conditionally subjecting, by a successive frame type elimination engine, packet header field values successively to a plurality of rules; and
      3. comparing, by a template match frame type identification engine, packet header regions against packet header templates, wherein frame type determinations by the successive frame type elimination engine and the template match frame type identification engine are prioritized over a frame type determination by the hardware frame type identification engine;
   b. selectively extracting, without intermediate processing, packet header field values from the plurality of packet header field values conveyed by each packet based on the source port via which the packet was received;
   c. pre-classifying the packet, irrespective of the format of the packet frame, based on the extracted packet header field values and ascribing a match type to the packet;
   d. searching one of packet switching information, packet routing information, and protocol virtual local area networking information tracked by the packet switching node based on one of extracted packet header field values, the match type, and the source port for formulating a preliminary switch response for the packet; and
   e. classifying the packet into one of a plurality of packet processing flows based on one of the source port identifier, the preliminary switch response, extracted packet header field values, and the match type.

12. A method as claimed in claim 11, wherein conditionally subjecting packet header filed values successively to a plurality of rules, the method further comprises:
   a. subjecting a packet header field value extracted from the packet header based on a packet header offset specified in a decision table record of a plurality of decision table records stored in decision table to a frame type identification test bit pattern specified in the decision table record; and
   b. selectively selecting a subsequent decision table record from the plurality of decision table records if a definitive frame type determination was not reached, and ascribing a frame type identifier specified in the decision table record otherwise.

13. A method as claimed in claim 11, further comprising selecting a frame type when at least two of inspecting packet header bit values and recognizing standardized packet header bit patterns, conditionally subjecting packet header field values successively to the plurality of rules, and comparing packet header regions against packet the header templates yields differing frame types.

14. A method as claimed in claim 11, wherein subsequent to selectively extracting packet header field values from the plurality of packet header field values conveyed by each packet, the method further comprises ascribing a preliminary action to be performed in respect of the packet.

15. A method as claimed in claim 11, wherein searching one of packet switching information, packet routing information, and protocol virtual local area networking information tracked by the packet switching node the method respectively comprises:
   a. querying a switching information database;
   b. querying a routing information database; and
   c. querying a virtual area networking table.

16. A method as claimed in claim 11, wherein classifying the packet into one of a plurality of packet processing flows the method further comprises conditionally ascribing a processing flow identifier to the packet based on conditions specified in one of a plurality of classification rule entries.

17. A method as claimed in claim 11, further comprising:
a. determining an action to be taken based on one of the source port, the frame type, and the processing flow classification;
b. selectively modifying the preliminary switch response in accordance with the action;
c. selectively modifying the packet header in accordance with the action; and
d. processing the packet in accordance with the switch response.

* * * * *